(12) United States Patent
Bye et al.

(10) Patent No.: US 7,271,364 B1
(45) Date of Patent: Sep. 18, 2007

(54) LASER WELDING FIXTURE AND METHOD

(75) Inventors: Lyle A. Bye, Lino Lakes, MN (US); David A. Crawford, Pine City, MN (US); George E. Greene, Shoreview, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 73 days.

(21) Appl. No.: 11/036,268

(22) Filed: Jan. 13, 2005

Related U.S. Application Data

(60) Provisional application No. 60/555,351, filed on Mar. 22, 2004.

(51) Int. Cl.
*B23K 26/42* (2006.01)

(52) U.S. Cl. ............... 219/121.63; 219/121.82; 219/121.58

(58) Field of Classification Search ........... 219/121.63, 219/121.64, 121.82, 158
See application file for complete search history.

(56) References Cited

U.S. PATENT DOCUMENTS

| 4,059,979 | A | * | 11/1977 | Mackie et al. | 72/342.94 |
| 4,214,766 | A | * | 7/1980 | Rall et al. | 279/46.7 |
| 4,594,757 | A | * | 6/1986 | Johnson, Jr. | 29/33 K |
| 4,952,769 | A | * | 8/1990 | Acheson | 219/76.14 |
| 5,609,102 | A | | 3/1997 | Rapp | |
| 5,716,057 | A | * | 2/1998 | Wright et al. | 279/62 |
| 6,371,274 | B1 | | 4/2002 | Ditter et al. | |

FOREIGN PATENT DOCUMENTS

| DE | 004315441 A1 | * | 11/1994 |
| FR | 2611543 A | * | 9/1988 |
| JP | 402280961 A | * | 11/1990 |
| JP | 403238188 A | * | 10/1991 |
| JP | 404356382 A | * | 12/1992 |
| JP | 407097023 A | * | 4/1995 |
| JP | 407202491 A | * | 8/1995 |
| JP | 2002052085 A | * | 2/2002 |

* cited by examiner

*Primary Examiner*—Samuel M. Heinrich
(74) *Attorney, Agent, or Firm*—Faegre & Benson, LLP

(57) ABSTRACT

A laser welding fixture for holding a workpiece includes a base, a processing head adapted to magnetically couple to the base, and a collet. The processing head has at least one collet holder assembly and at least one stop. The collet is removably coupled to the holder assembly.

25 Claims, 11 Drawing Sheets

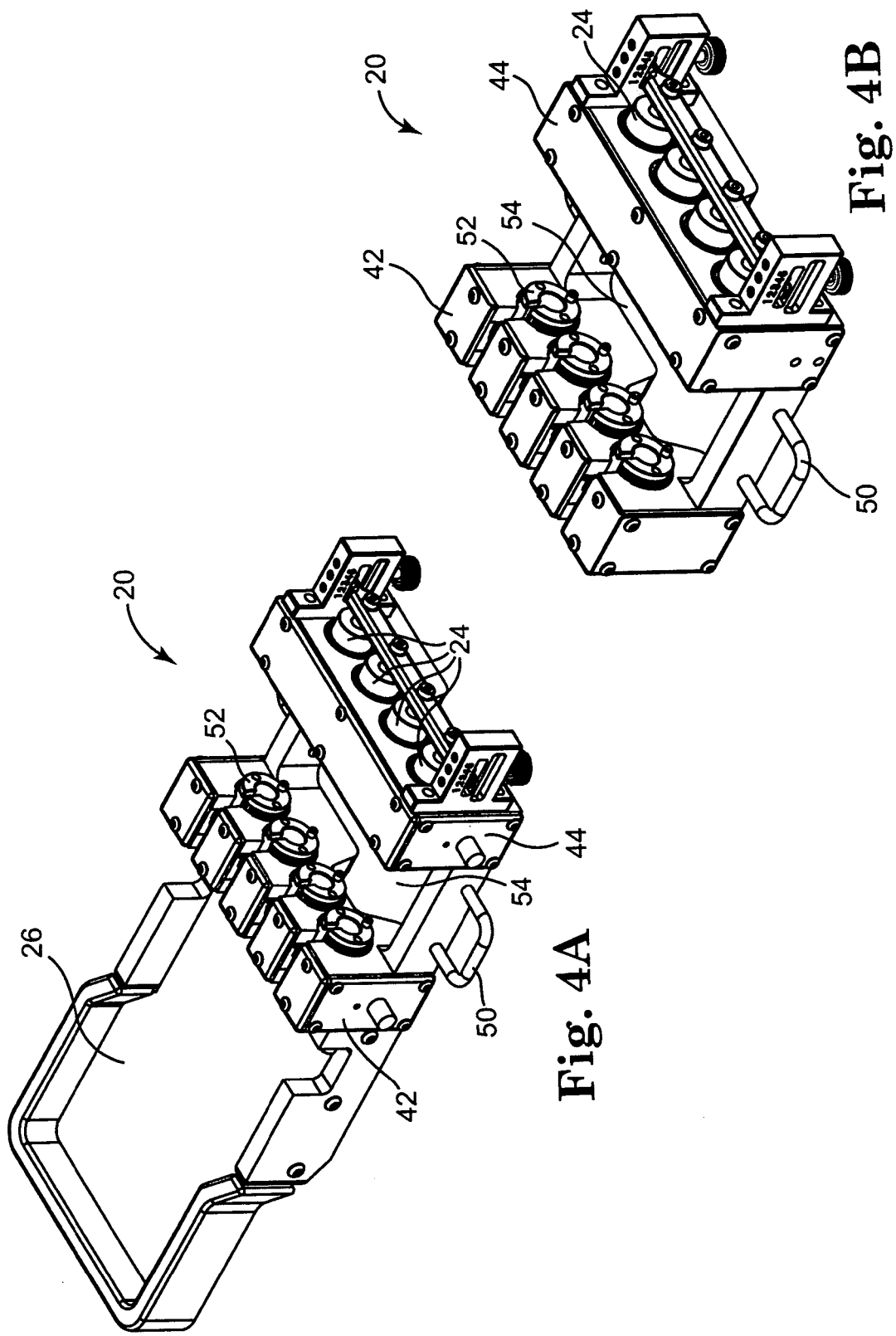

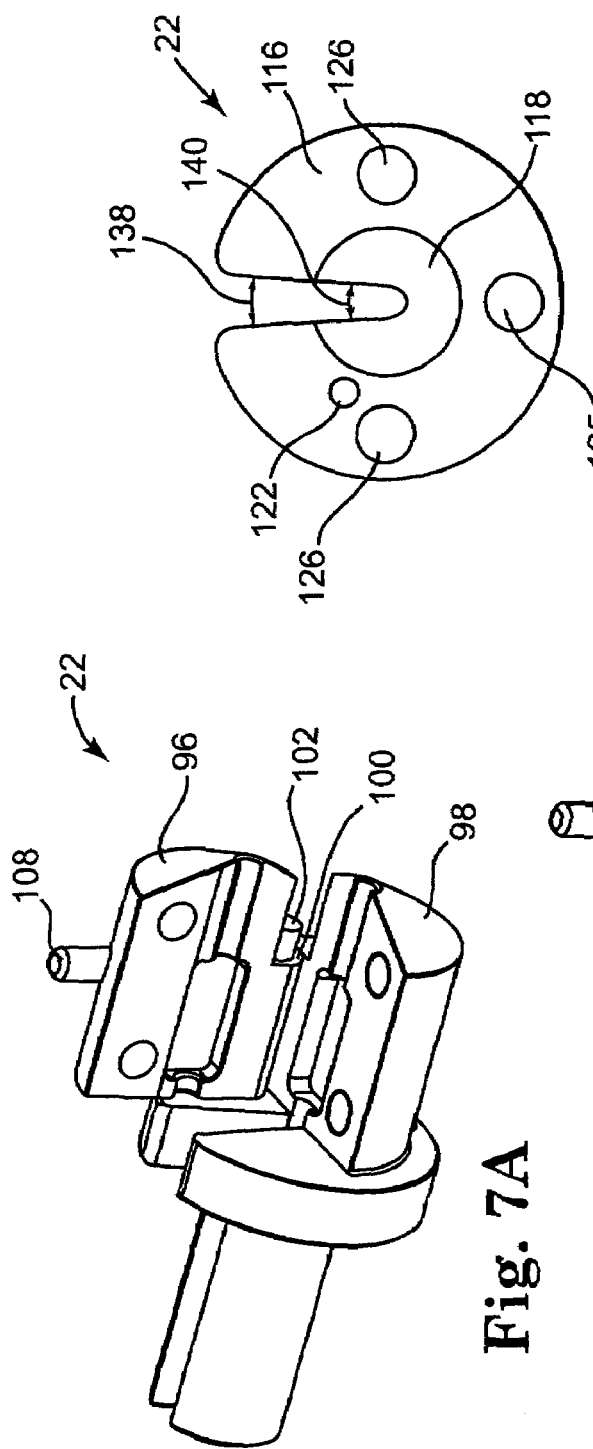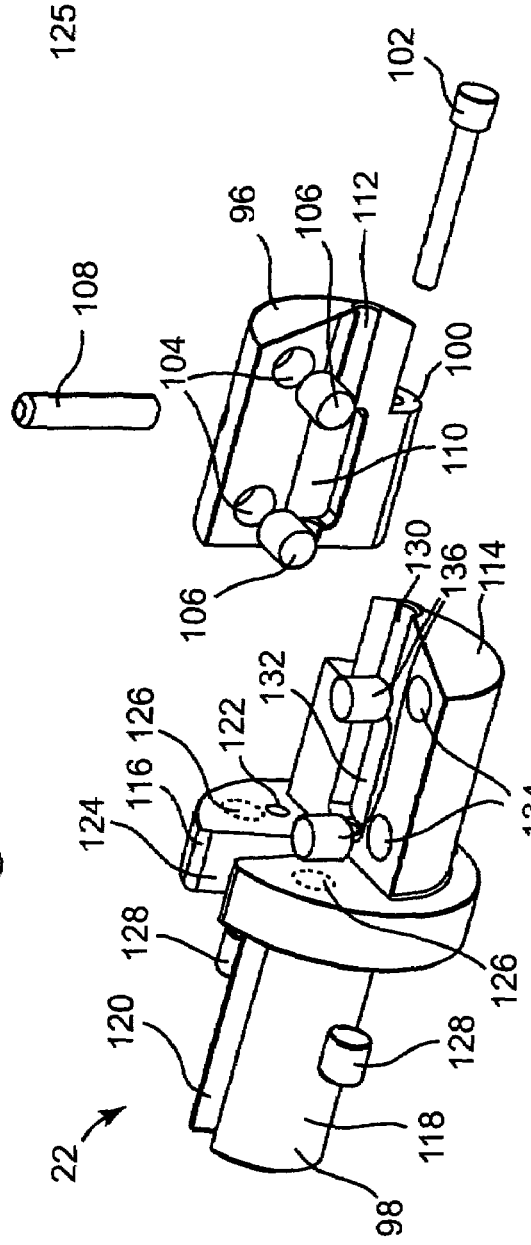

LASER WELDING FIXTURE AND METHOD

CROSS-REFERENCE TO RELATED APPLICATION

This application claims priority under 35 U.S.C. 119(e) to U.S. provisional patent application 60/555,351, filed Mar. 22, 2004, which is hereby incorporated by reference.

TECHNICAL FIELD

The present invention is related to a welding fixture for a laser welding system. More particularly, it relates to a universal, rotary welding fixture adapted for high-volume laser welding applications.

BACKGROUND

Laser welding offers several advantages over other types of welding. Specifically, it offers excellent precision welds, with a minimum heat-zone, which allows welding near heat-sensitive components. Laser welding is non-contact, which prevents tool wear and also enables welding without application of a mechanical load to a workpiece. Moreover, it is highly reproducible and creates a weld with a clean appearance. Laser welding is used for a wide variety of applications, including automotive, microtechnology, telecommunications, packaging, and medical devices. Medical device applications include the manufacture of syringes, stents, and leads for cardiac rhythm management devices, such as pacemakers and defibrillators.

Known fixtures for producing laser welds on leads typically require threading of a lead through a hole or tube, which holds the lead in position during welding. Often, the fixtures are adapted to support only one lead at a time. There is a need in the art for a fixture that enables efficient loading of parts. There is a further need for a fixture that is readily adaptable to support various part configurations.

SUMMARY

The present invention, according to one embodiment, is a laser welding fixture for holding a workpiece. The fixture includes a base, a processing head adapted to magnetically couple to the base, and a collet. The processing head has at least one collet holder assembly and at least one stop. The collet is removably coupled to the holder assembly.

The present invention, according to another embodiment, is a method of using a laser welding fixture, the method comprising providing a laser welding fixture for holding a workpiece, the fixture comprising a base, a processing head adapted to magnetically couple to the base, the processing head having at least one collet holder assembly and at least one stop, and a collet removably coupled to the collet holder assembly, placing a workpiece in the collet, loading the collet into the processing head, loading the processing head into the laser welding fixture, positioning the collet stop at an appropriate distance from the collet, performing the welding operation on the workpiece, removing the processing head from the laser welding fixture, removing the collets from the processing head, and removing the workpieces from the collets.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIGS. 4A-4E show various embodiments of a fixture processing head, according to various embodiments of the present invention.

FIGS. 7A-7C show various views of a collet, according to an embodiment of the present invention.

DETAILED DESCRIPTION

Figure 1:
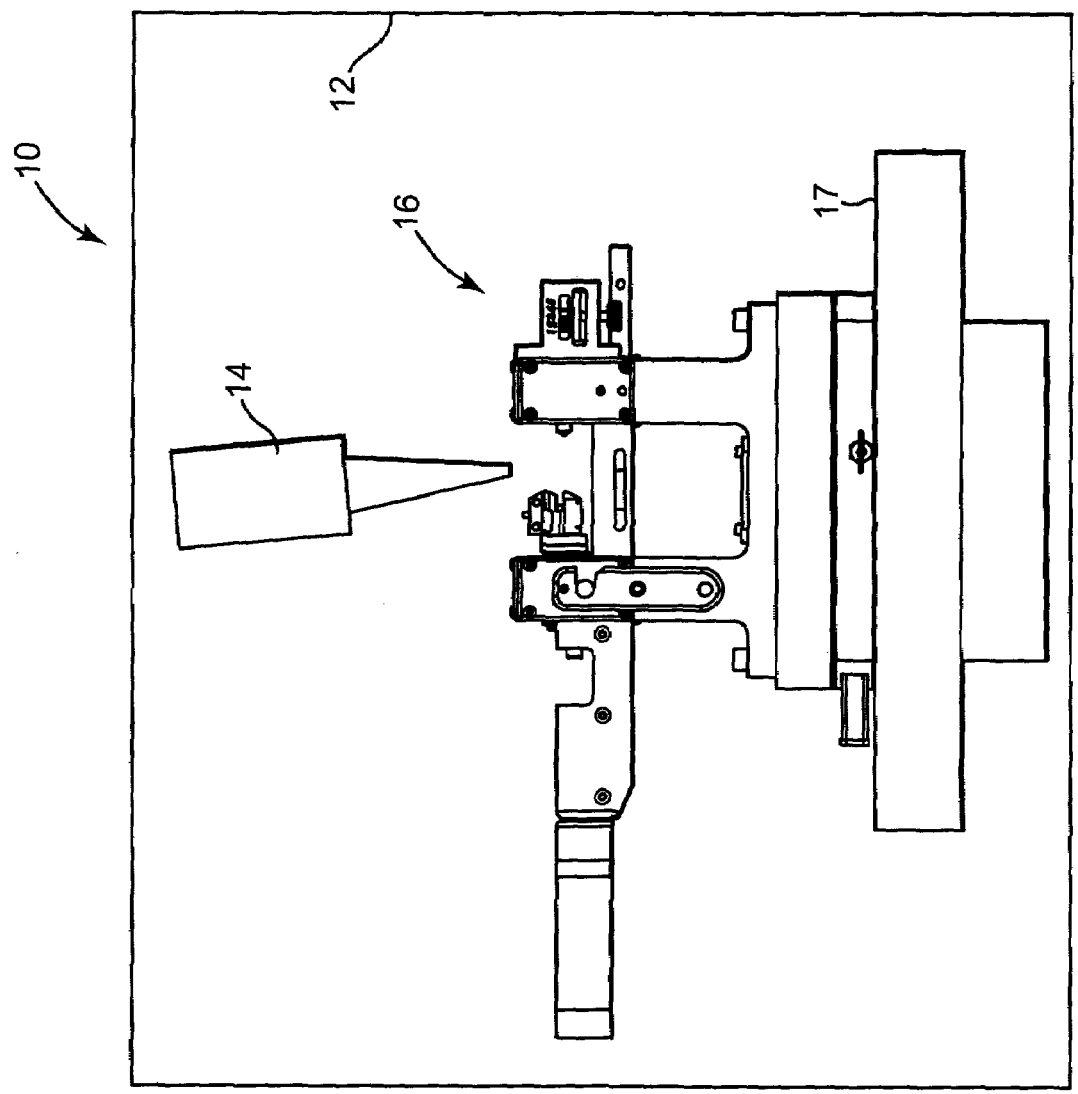
FIG. 1 is a side plan view showing a laser welding system, according to one embodiment of the present invention.

FIG. 1 shows a perspective view of a laser welding system 10, according to one embodiment of the present invention. As shown in FIG. 1, the system 10 includes a housing 12, a laser source 14, a fixture 16, and a mounting platform 17. The housing 12 contains the laser source 14 and the fixture 16. The fixture 16 securely supports and positions a workpiece (not shown) and the laser source 14 operates to direct a laser beam at an appropriate weld joint. The fixture 16 couples to the mounting platform 17.

Figure 2:
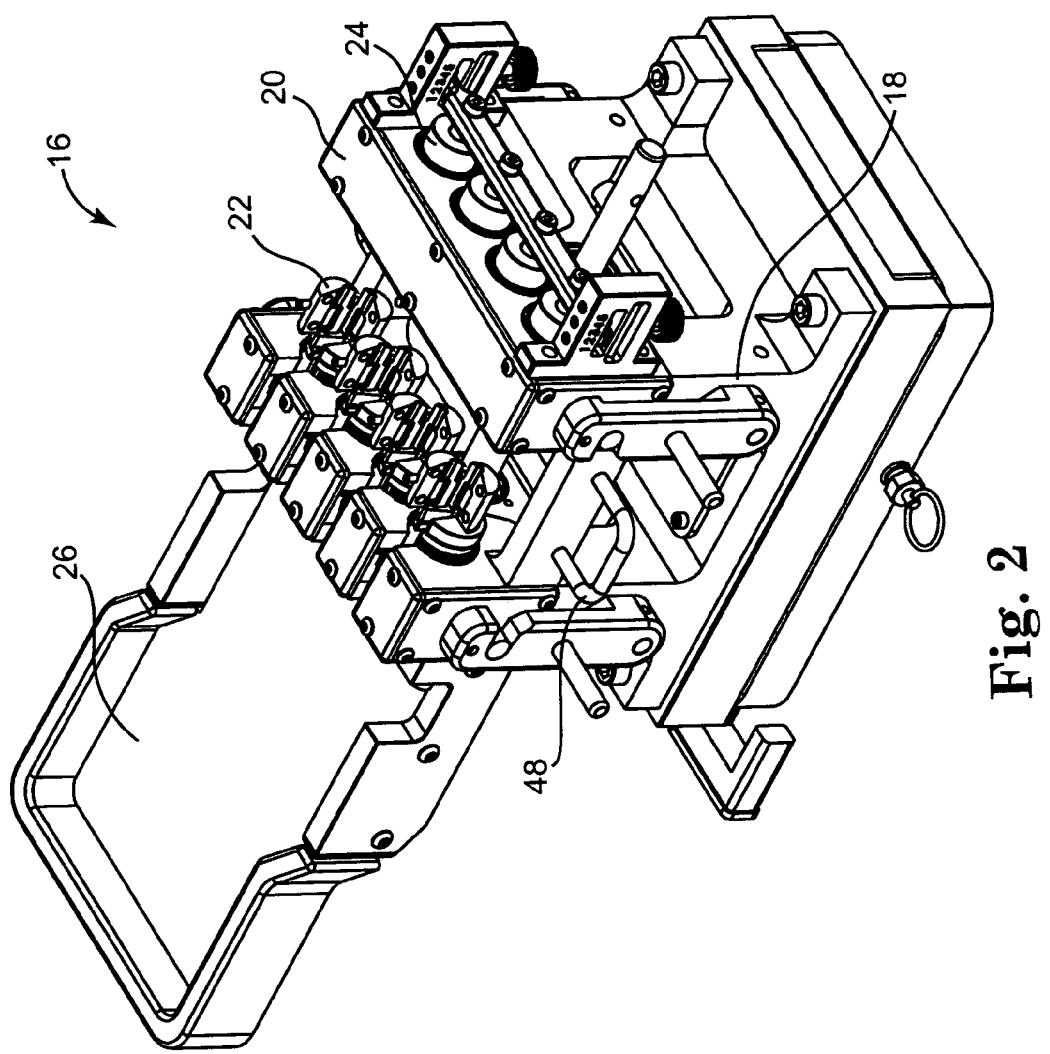
FIG. 2 is a perspective view showing a laser welding fixture, according to one embodiment of the present invention.

FIG. 2 is a perspective view of the fixture 16, according to one embodiment of the present invention. The fixture 16 includes a base 18, a processing head 20, collets 22, and collet stops 24. As shown in FIG. 2, a tray 26 is removably attached to the processing head 20, but in an alternative embodiment, the tray 26 can be removably attached to the base 18. The tray 26 is sized to hold portions of the workpiece that are not undergoing a welding operation. The processing head 20 holds the portion of a workpiece that is undergoing a welding operation. The base 18 is adapted for coupling with a portion of the laser welding system 10. In one embodiment, the processing head 20 is removably coupled to the base 18. This removable coupling may be magnetic or may be achieved in some other manner. The collets 22 are releasably coupled to the processing head 20. In one embodiment, the collets 22 are magnetically coupled to the processing head 20. In this embodiment, the collets 22 can be rapidly exchanged to allow use of the processing head 20 with different workpiece configurations.

The fixture 16, in one embodiment, includes a second processing head 20. Use of a second processing head 20 enhances efficiency by allowing the second processing head 20 to be loaded with one or more workpieces, while the workpieces held by the first processing head 20 are welded. The processing head 20, in one embodiment, as further explained below, is configurable to allow use with various types and sizes of workpieces.

Figure 3A:
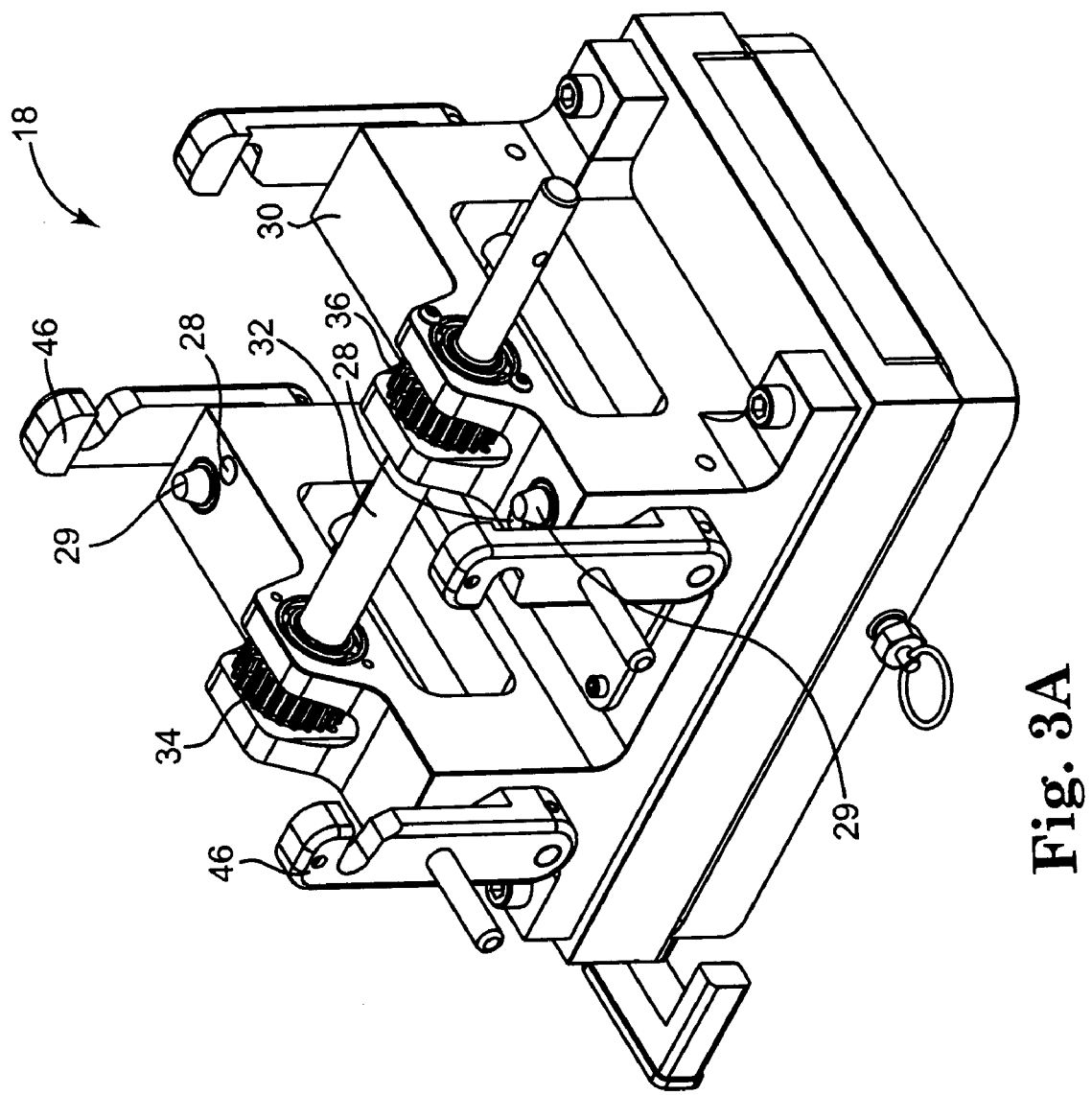
FIGS. 3A-3B show various embodiments of a fixture base, according to various embodiments of the present invention.
Figure 3B:
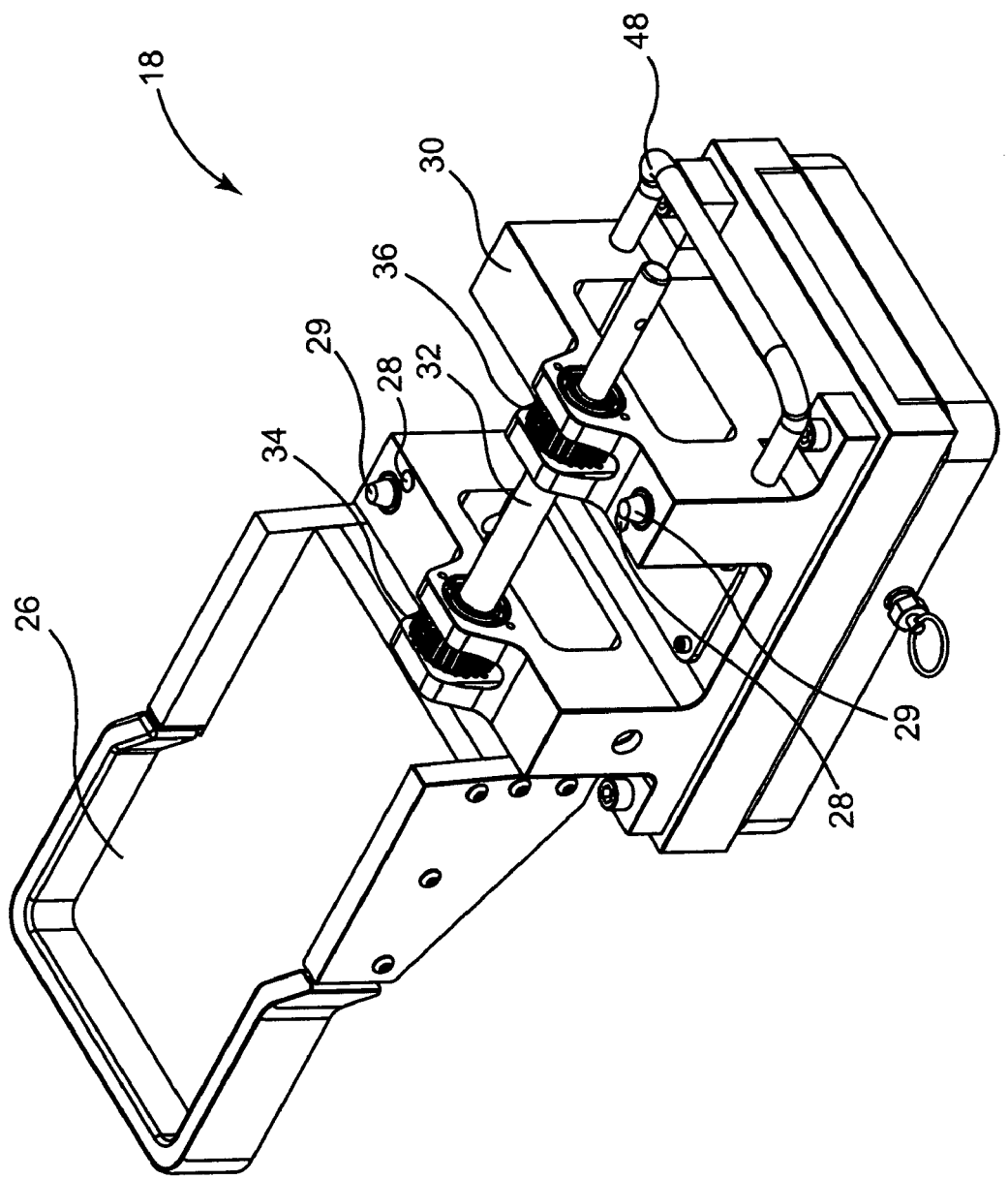

FIGS. 3A-3B show various views of the base 18. The base 18 is configured to couple to a portion of the laser welding system 10, such as the mounting platform 17. It is further configured to couple to and releasably secure the processing head 20. In the embodiments shown in FIGS. 3A-3B, the base 18 includes magnets 28 located on the top surface 30 for releasably coupling with the processing head 20. The base 18 also includes a drive shaft 32 that is mechanically coupled to a first set of drive gears 34 and a second set of drive gears 36. The drive gears 34 and 36 are designed to mate with corresponding driven gears 38 and 40 (shown in FIG. 4C) on the processing head 20. In one embodiment, the first set of drive gears 34 is adapted for driving the collet side 42 of the processing head 20 and the second set of drive gears 36 is adapted for driving the stop side 44 of the processing head 20.

The base 18 also includes clamps 46 for clamping the processing head 20 to the base 18. As shown in FIG. 3B, the base 18 can also include a handle 48 for lifting the base 18. In this embodiment, the tray 26 is releasably coupled to the base 18. Alternatively, the tray 26 can be coupled to the processing head 20.

Figure 4C:
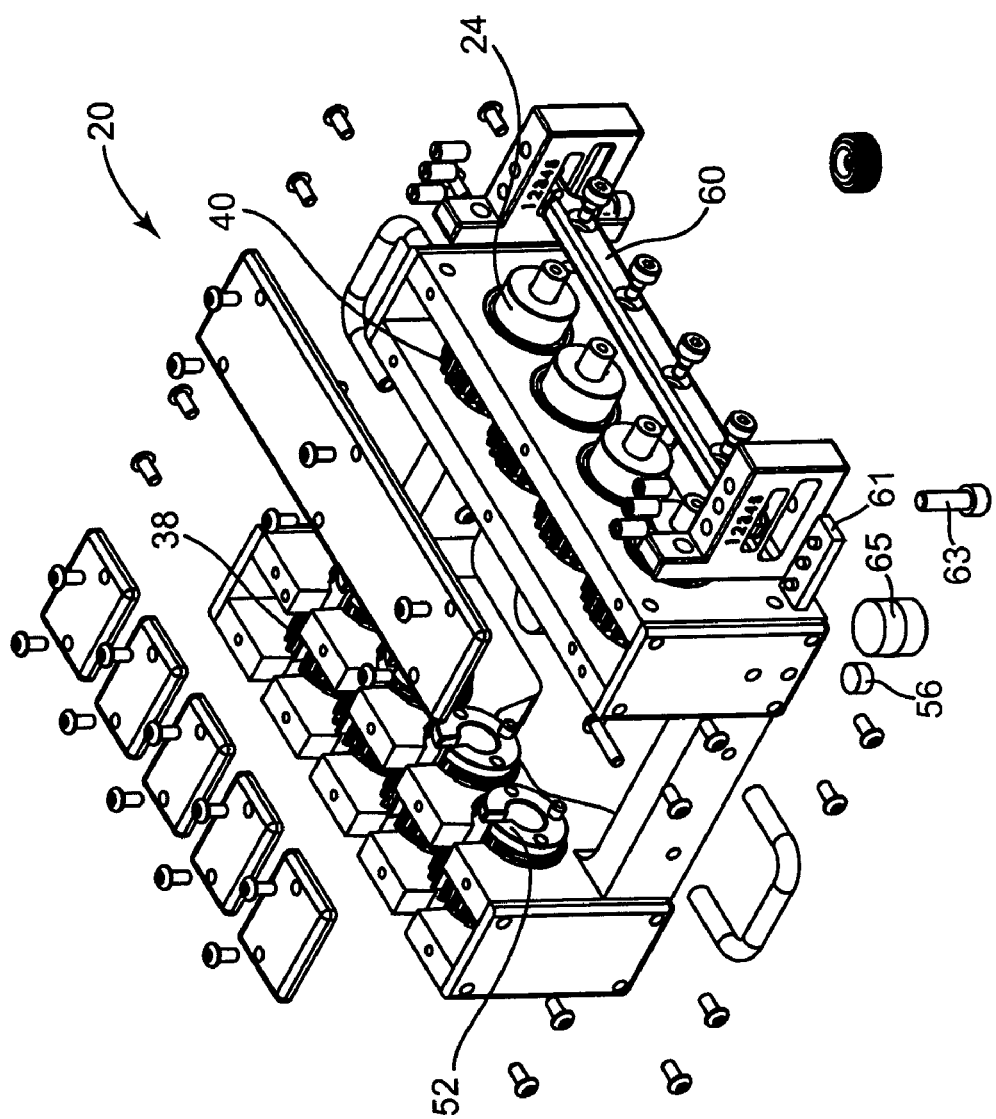
Figure 4E:
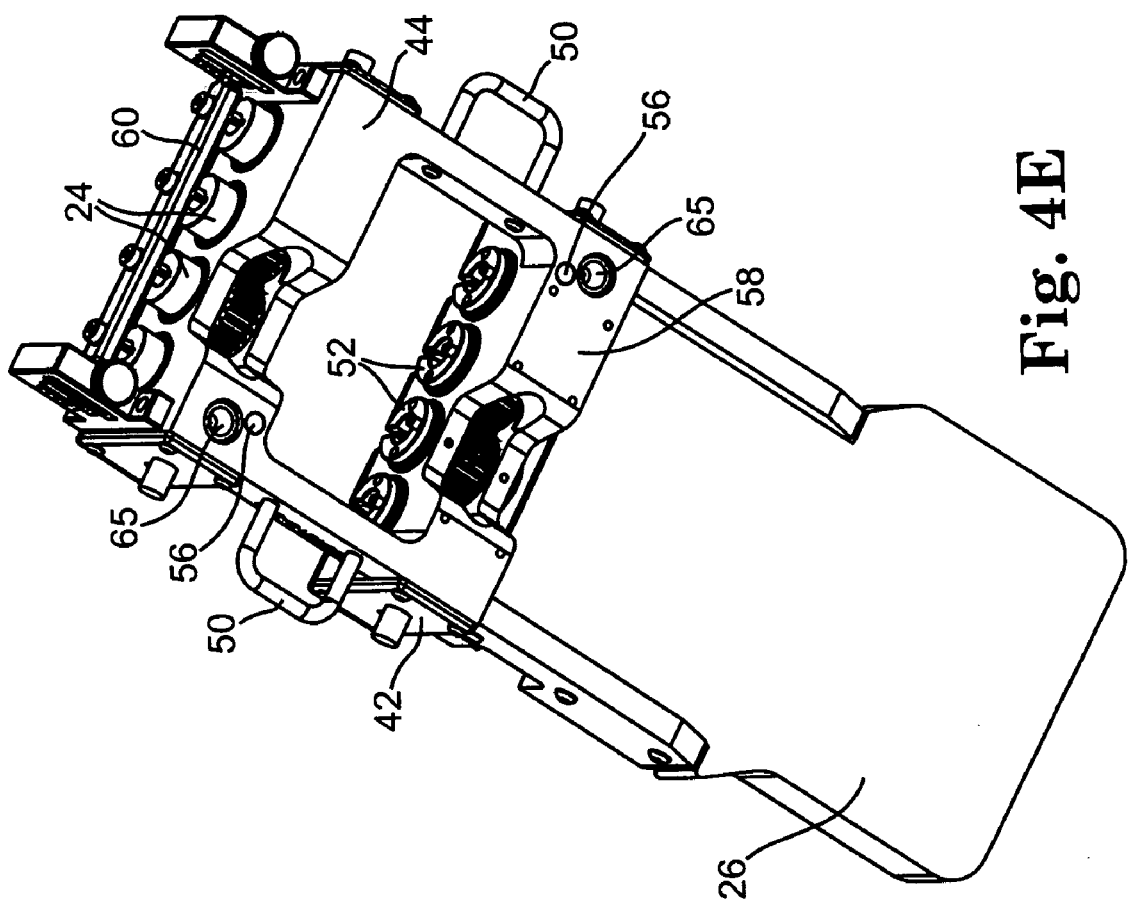

FIGS. 4A-4D show various views of the processing head 20. The processing head 20 includes a collet side 42 and a stop side 44. As shown in FIG. 4A, the processing head 20 includes handles 50, holder assemblies 52 and the collet stops 24. The processing head 20 defines an open space 54 between the holder assemblies 52 and the collet stops 24. In the embodiments shown in FIGS. 4A-4D, the processing head 20 includes four holder assembly/stop pairs, but in other embodiments, any other number of pairs may be used. The welding operation is typically performed on the workpiece in the open area between the holder assembly/stop pairs.

In the embodiment shown in FIG. 4A, the tray 26 is removably connected to the processing head 20. Alternatively, the tray 26 may be removably connected to the base 18. The processing head 20 shown in FIG. 4C includes a first set of gears 38 designed to mate with the first set of gears 34 of the base 18. The processing head 20 also includes a second set of gears 40 designed to mate with the second set of gears 36 of the base 18. The first set of gears 38 is mechanically coupled to the holder assemblies 52 and operates to rotate the collets 22 and therefore the workpieces during operation. The second set of gears 40 is mechanically coupled to the collet stops 24 and operates to rotate the collet stops 24 in coordination with the rotation of the collets 22.

Figure 4D:
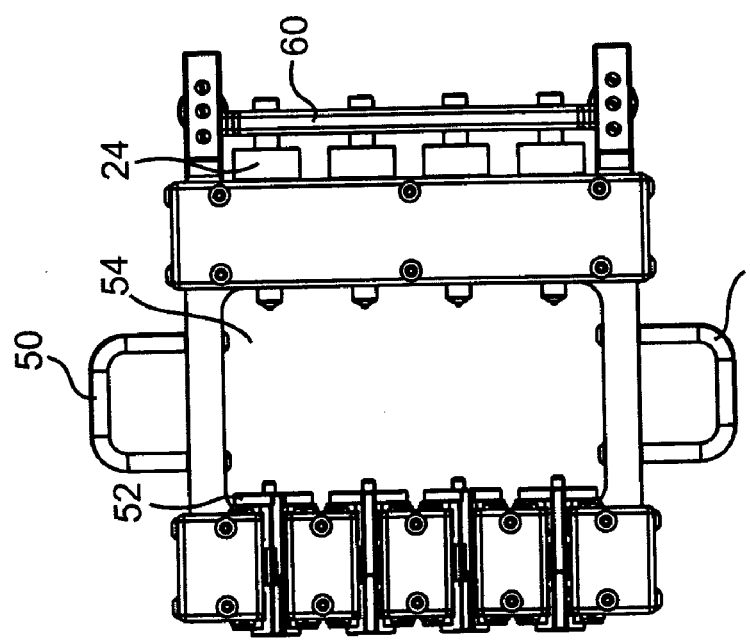

The processing head 20 further includes magnets 56 on the bottom surface 58. The magnets 56 are adapted to couple with the magnets 28 on the top surface 30 of the base 18. As shown in FIG. 4D, the collet stops 24 are coupled to a slideable positioning bar 60, which may be moved toward or away from the collets 22 to decrease or increase the distance between the collets 22 and the collet stops 24.

Figure 5B:
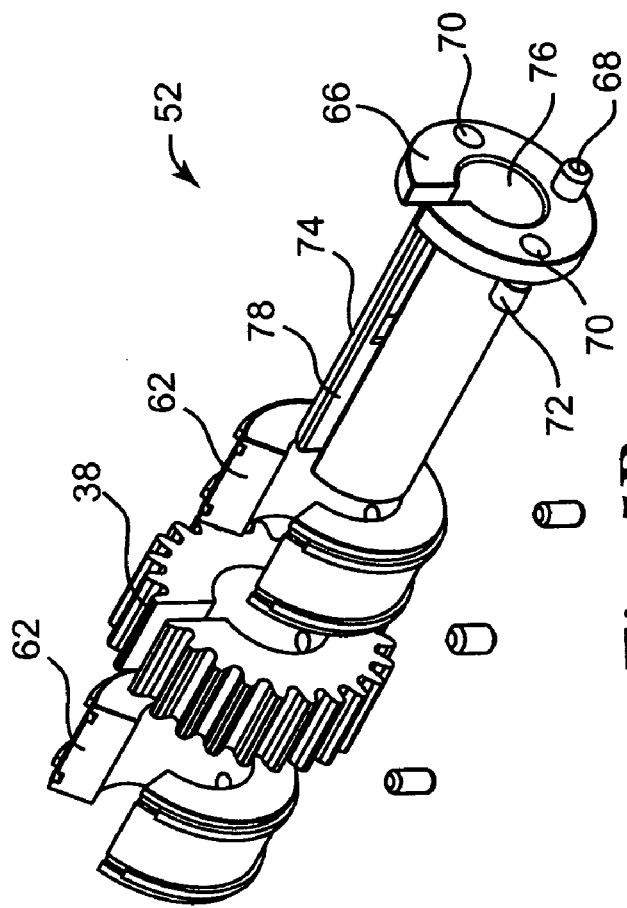
FIGS. 5A-5B show various views of a slotted collet holder assembly, according to various embodiments of the present invention.
Figure 5A:
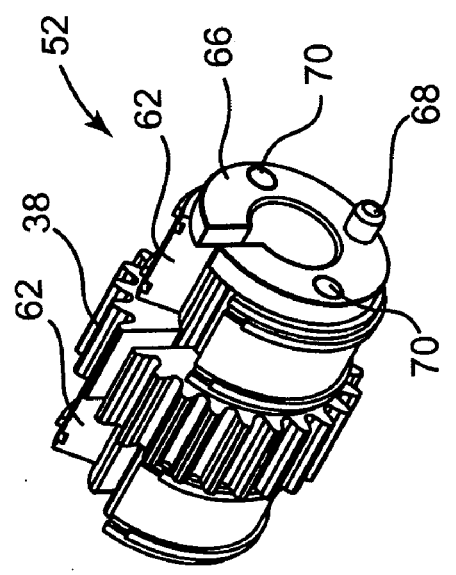

FIGS. 5A-5B show various views of the collet holder assemblies 52. The collet holder assemblies 52 include bearings 62, a split gear 38 interposed between the bearings 62, a flange 66, and a dowel 68. As shown in FIG. 5B, the collet holder assemblies 52 also include magnet cavities 70. Magnets 72, adapted for coupling with the collets 22, are inserted in magnet cavities 70. An insert 74 is slideably inserted into the split gear 38. The insert 74 includes a longitudinal bore 76. A slot 78 runs longitudinally down the holder assembly 52, creating a space adapted for allowing a workpiece (not shown) to be placed in the holder assembly 52 from above without requiring the workpiece to be threaded through a narrow lumen. The slot 78 intersects with the bearings 62, the split gear 38, the flange 66, and the insert 74.

Figure 6A:
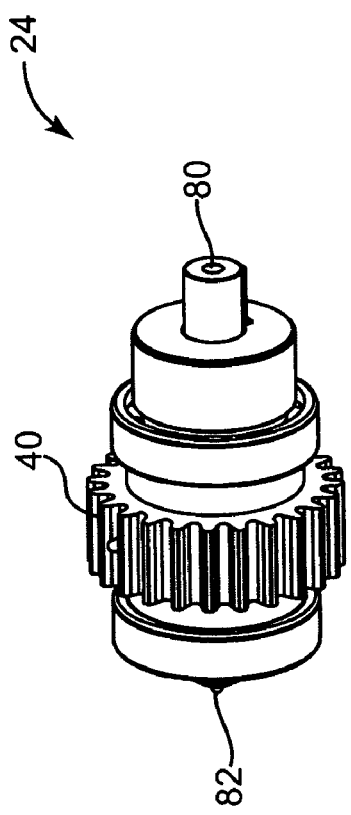
FIGS. 6A-6B show various views of a stop, according to various embodiments of the present invention.
Figure 6B:
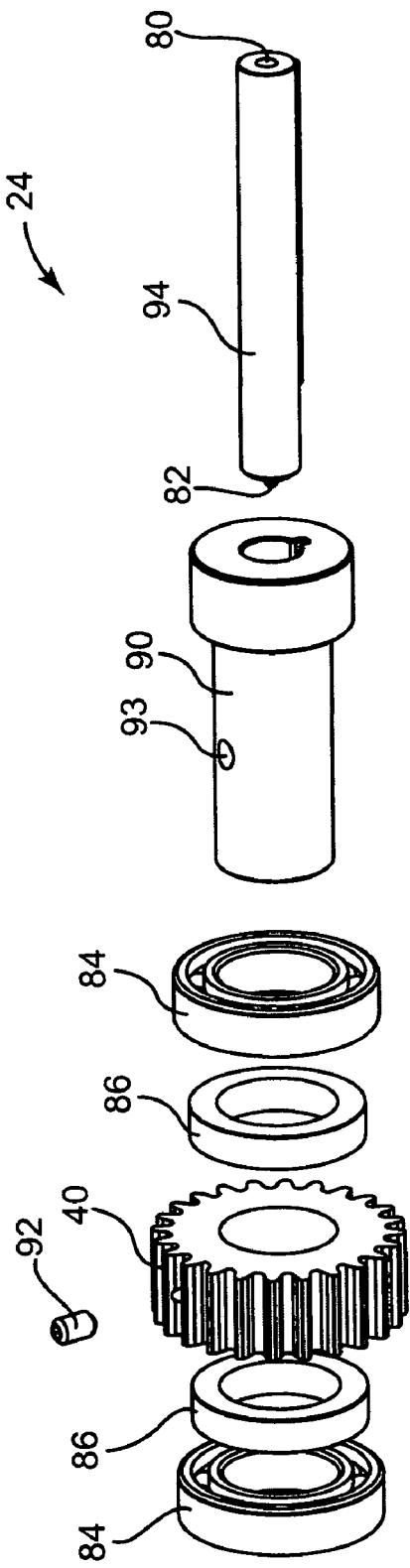

FIGS. 6A-6B show various views of the collet stops 24. The collet stops 24 include a collet end 80 and a stop end 82. The collet stops 24 also include bearings 84, spacers 86, a gear 40 located between the spacers 86, a sleeve 90, and a fastener 92 inserted into bore 93, thereby linking the gear 88 and the sleeve 90. An adjustable mandrel 94 is located at the collet end 80 and is slideably inserted into the sleeve 90. The adjustable mandrel 94 may be used to compress a coiled lead assembly by placing the lead assembly into the processing head 20 and then sliding the stops toward the collets 22.

FIGS. 7A-7C show various views of the collets 22. FIG. 7A shows a perspective view of the collet 22 after assembly. The collet 22 includes a first portion 96 and a second portion 98. The first portion 96 is connected to the second portion 98 via a hinge 100 and a hinge pin 102, allowing the collet 22 to maintain an open or closed position. The hinged design allows loading of a workpiece without requiring threading through a lumen. This hinged design increases an operator's loading efficiency. As shown in FIG. 7B, the first portion 96 includes magnet cavities 104 and magnets 106 inserted into the cavities 104. The first portion 96 further includes a dowel 108, a pad cavity 110, and a workpiece cavity 112 adapted to receive a workpiece.

The second portion 98 includes a support section 114, a flange 116, and a base 118. The base 118 includes a slot 120 and is adapted for insertion into the bore 76 of the collet holder assembly 52. The flange 116 includes a pin bore 122, a slot 124, and magnet cavities 126 into which magnets 128 are inserted. The hinge pin 102 is inserted in pin bore 122.

The support section 114 includes a workpiece cavity 130, a pad cavity 132, and magnet cavities 134. Magnets 136 are inserted into the magnet cavities 134. The magnet cavities 134 are aligned with the first section magnet cavities 104 so that when the collet 22 is closed the magnetic force between the magnets 106 and 136 keeps the collet 22 releasably closed. The slots 120 and 124 allow a workpiece to be placed in the collet 22 from above instead of requiring the workpiece to be threaded through a lumen.

A pad of a resilient material (not shown) such as silicone may be inserted into the pad cavities 110 and 132 to help retain the workpiece in the desired position in the collet 22. The workpiece cavities 112 and 130 may be coated with silicone or some other material to help retain the workpiece in the desired position in the collet 22. The pads 112 and 130 and coated cavities 110 and 132 also reduce the possibility of damage to the workpiece during processing. The dimensions of workpiece cavities 112 and 130 may vary as needed. The dimensions of the pad cavities 110 and 132 may also vary as needed, as can the number and position of magnets 106, 128, and 136. The number of magnets 106 on the first portion 96 need not correspond to the number of magnets 136 on the bottom portion 98.

As shown in the rear plan view of the collet 22 in FIG. 7C, an angle 138 in the slot of 124 of the flange 116 and an angle 140 in the slot 120 of the base 118 can vary as needed for a particular workpiece. The magnet cavities 126 are aligned so that a magnetic force is created between the magnets 128 and the magnets 72 of the collet holder assembly 52. The dowel 68 of the collet holder assembly 52 is inserted into a bore 125 located in the flange 116, thereby maintaining the position of the collet 22 with respect to the collet holder 52.

Figure 8:
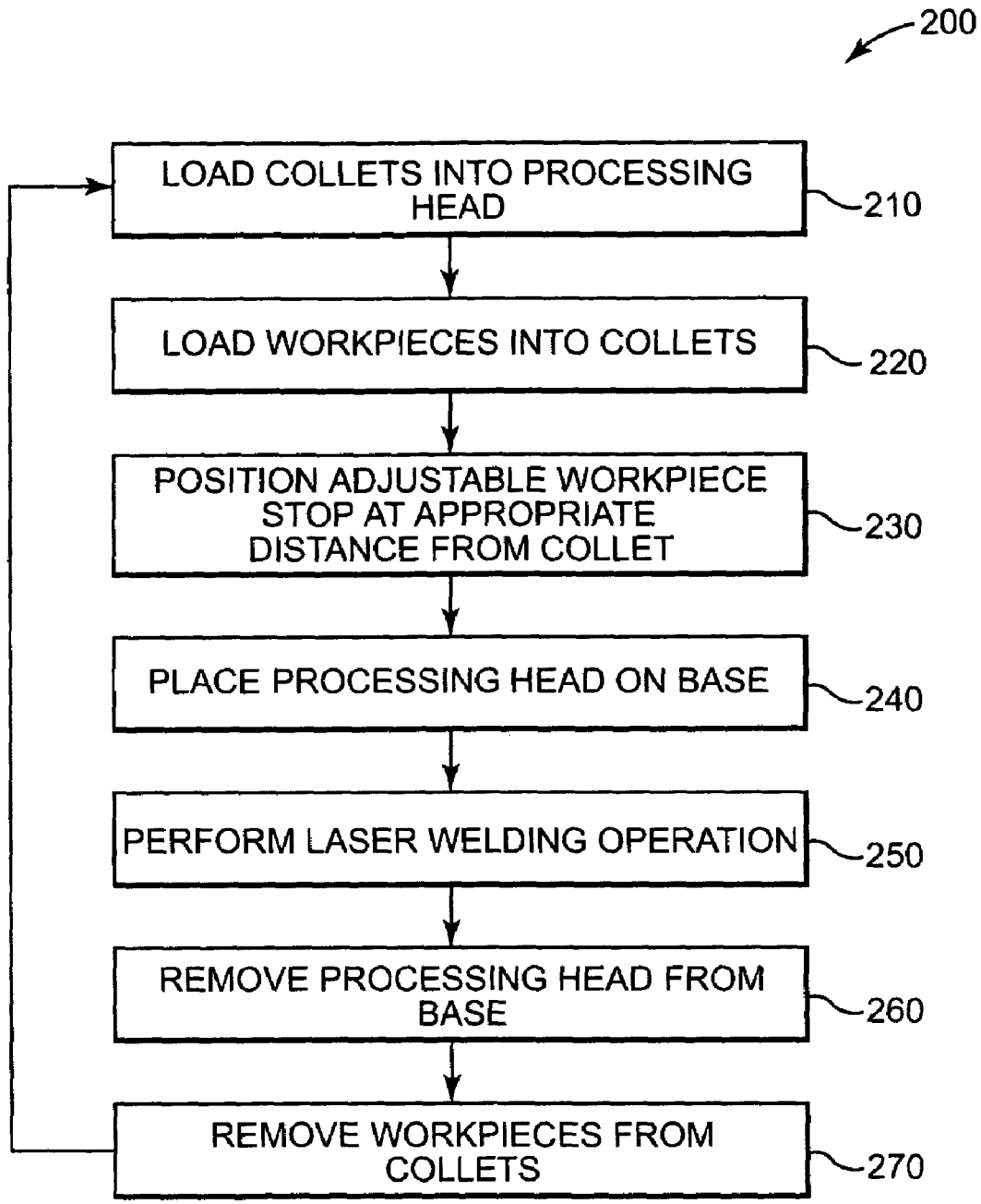
FIG. 8 shows a flowchart illustrating a method of using the laser welding system.

FIG. 8 is a flowchart illustrating a method 200 of using the laser welding system 10. During operation, a workpiece is placed into one of the collets 22 and the collet 22 is closed to encircle the workpiece (block 210). In one embodiment, a straight wire is used as a mandrel and inserted through a longitudinal lumen of the lead assembly. The collets 22 are then loaded into the processing head 20 (block 220) and the processing head 20 is placed on the base 18, which is mounted in laser welding system 10 (block 230). The collet end 80 of the collet stop 24 is then positioned at the appropriate distance from the collet 22 (block 240).

The tray 26 may be attached to the base 18 or may be attached to the processing head 20. The laser welding system 10, which is controlled by software generally known in the art, then performs the programmed welding operations on each workpiece mounted in the processing head 20 (block 250). During the welding operation, the operator may load a second processing head 20 with additional workpieces. After completion of the welding operation, the first processing head 20 is removed from the base 18 (block 260) and the second processing head 20 can be mounted on the base 18. The collets 22 are removed from the first processing head 20 (270) and the workpieces are removed from the collets 22 (280). The operator may then repeat this cycle by re-loading the first processing head 20.

Although the present invention has been described with reference to exemplary embodiments, persons skilled in the art will recognize that changes may be made in form and detail without departing from the spirit and scope of the invention.

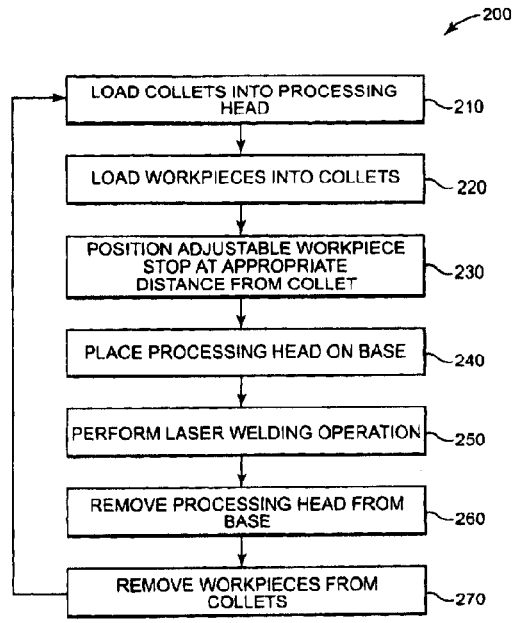

We claim:

1. A laser welding fixture for holding a workpiece, the fixture comprising:
   a base;
   a processing head magnetically coupled to the base, the processing head having at least one collet holder assembly and at least one stop; and
   a collet removably and magnetically coupled to the collet holder assembly.

2. The fixture of claim 1 wherein the collet includes a first portion magnetically coupled to a second portion and further wherein the collet includes an internal cavity adapted to accept a portion of the workpiece.

3. The fixture of claim 1 further including a second processing head adapted to magnetically couple to the base.

4. The fixture of claim 1 wherein the collet and the holder assembly include a slot to accept the workpiece.

5. The fixture of claim 2 wherein the internal cavity is coated with a material to help retain the work piece in the internal cavity.

6. The fixture of claim 5 wherein the material is silicone.

7. The fixture of claim 2 wherein the first portion and second portion are hinged so that the collet can maintain an open or closed position.

8. The fixture of claim 1 wherein the workpiece is a lead assembly.

9. The fixture of claim 1 further including a tray sized to hold portions of the workpiece not undergoing a welding operation.

10. The fixture of claim 9 wherein the tray is releasably attached to the processing head.

11. The fixture of claim 9 wherein the tray is releasably attached to the base.

12. The fixture of claim 1 further including a clamp adapted to couple the processing head to the base.

13. The fixture of claim 1 wherein the fixture has four collet holder assemblies and further has four stops.

14. The fixture of claim 1 further including a positioning bar adapted to move toward or away from the collet holder assembly, thereby varying the space between the collet holder assembly and the stop.

15. The fixture of claim 14 wherein the positioning bar is slideable.

16. The fixture of claim 1 wherein the collet further includes at least one cavity adapted to retain a resilient material.

17. The fixture of claim 16 wherein the material is silicone.

18. A method of using a laser welding fixture, the method comprising:
   providing a laser welding fixture for holding a workpiece, the fixture comprising:
      a base;
      a processing head adapted to magnetically couple to the base; the processing head having at least one collet holder assembly and at least one stop; and
      a collet adapted to magnetically couple to the collet holder assembly;
   placing a workpiece in the collet;
   loading the collet into the processing head;
   loading the processing head onto the base;
   positioning the collet stop at an appropriate distance from the collet; and
   performing the welding operation on the workpiece.

19. The method of claim 18 further comprising:
   removing the processing head from the laser welding fixture;
   removing the collets from the processing head; and
   removing the workpieces from the collets.

20. The method of claim 19 further comprising providing a second processing head, loading the second processing head with a workpiece, and performing the welding operation on the workpiece in the second processing head while removing the workpieces from the first processing head.

21. A welding fixture comprising:
   a base comprising a shaft, the shaft comprising a first gear and a second gear;
   a processing head removably and magnetically coupled to the base, the processing head comprising:
      a collet holder assembly comprising a third gear, and
      a stop comprising a fourth gear, wherein the third gear interfaces with the first gear and the fourth gear interfaces with the second gear such that a rotation of the shaft causes a rotation of the collet holder assembly and the stop; and
   a collet removably coupled to the collet holder assembly.

22. The welding fixture of claim 21, wherein the first gear and the second gear are of a first size, and wherein the third gear and the fourth gear are of a second size, such that a rotation of the shaft causes a rotation of the collet holder assembly and the stop in a coordinated rotational speed and direction.

23. The welding fixture of claim 21, wherein a size of each of the first, second, third, and fourth gears is selected to permit a rotation of the shaft to cause a rotation of the collet holder assembly and the stop in a coordinated rotational speed and direction.

24. The welding fixture of claim 21, wherein the collet comprises a hinge joining a first portion of the collet and a second portion of the collet, the hinge configured to permit rotation of the first portion about a first axis substantially parallel with a second axis of rotation of the collet.

25. The welding fixture of claim 24, wherein the first portion is magnetically coupled with the second portion.

* * * * *

UNITED STATES PATENT AND TRADEMARK OFFICE
CERTIFICATE OF CORRECTION

PATENT NO.       : 7,271,364 B1                                        Page 1 of 3
APPLICATION NO.  : 11/036268
DATED            : September 18, 2007
INVENTOR(S)      : Lyle A. Bye et al.

It is certified that error appears in the above-identified patent and that said Letters Patent is hereby corrected as shown below:

Replace the text of all published Claims 1-25 with the following correct Claims 1-22:

1. A laser welding fixture for holding a workpiece, the fixture comprising:
a base;
a processing head adapted to magnetically couple to the base, the processing head having at least one collet holder assembly and at least one stop; and
a collet removably coupled to the collet holder assembly.

2. The fixture of claim 1 wherein the collet includes a first portion magnetically coupled to a second portion and further wherein the collet includes an internal cavity adapted to accept a portion of the workpiece.

3. The fixture of claim 1 wherein the collet is magnetically coupled to the holder assembly.

4. The fixture of claim 1 further including a second processing head adapted to magnetically couple to the base.

5. The fixture of claim 1 wherein the collet and the holder assembly include a slot to accept the workpiece.

6. The fixture of claim 2 wherein the internal cavity is coated with a material to help retain the work piece in the internal cavity.

7. The fixture of claim 6 wherein the material is silicone.

8. The fixture of claim 2 wherein the first portion and second portion are hinged so that the collet can maintain an open or closed position.

9. The fixture of claim 1 wherein the workpiece is a lead assembly.

Signed and Sealed this

Eighteenth Day of May, 2010

David J. Kappos
*Director of the United States Patent and Trademark Office*

10. The fixture of claim 1 further including a tray sized to hold portions of the workpiece not undergoing a welding operation.

11. The fixture of claim 10 wherein the tray is releasably attached to the processing head.

12. The fixture of claim 10 wherein the tray is releasably attached to the base.

13. The fixture of claim 1 further including a clamp adapted to couple the processing head to the base.

14. The fixture of claim 1 wherein the fixture has four collet holder assemblies and further has four stops.

15. The fixture of claim 1 further including a positioning bar adapted to move toward or away from the collet holder assembly, thereby varying the space between the collet holder assembly and the stop.

16. The fixture of claim 15 wherein the positioning bar is slideable.

17. The fixture of claim 1 wherein the collet further includes at least one cavity adapted to retain a resilient material.

18. The fixture of claim 17 wherein the material is silicone.

19. A laser welding system, the system comprising:
a laser source;
a housing; and
a laser welding fixture, the laser welding fixture further comprising:
a base;
a processing head adapted to magnetically couple to the base; the processing head having at least one collet holder assembly and at least one stop; and
a collet removably coupled to the collet holder assembly.

20. A method of using a laser welding fixture, the method comprising:
providing a laser welding fixture for holding a workpiece, the fixture comprising:
a base;
a processing head adapted to magnetically couple to the base; the processing head having at least one collet holder assembly and at least one stop; and
a collet removably coupled to the collet holder assembly;
placing a workpiece in the collet;
loading the collet into the processing head;
loading the processing head into the laser welding fixture;
positioning the collet stop at an appropriate distance from the collet; and
performing the welding operation on the workpiece.

21. The method of claim 20 further comprising:
removing the processing head from the laser welding fixture;
removing the collets from the processing head; and
removing the workpieces from the collets.

22. The method of claim 21 further comprising providing a second processing head, loading the second processing head with a workpiece, and performing the welding operation on the workpiece in the second processing head while removing the workpieces from the first processing head.

UNITED STATES PATENT AND TRADEMARK OFFICE
CERTIFICATE OF CORRECTION

| | | |
|---|---|---|
| PATENT NO. | : 7,271,364 B1 | |
| APPLICATION NO. | : 11/036268 | |
| DATED | : September 18, 2007 | |
| INVENTOR(S) | : Lyle A. Bye et al. | |

It is certified that error appears in the above-identified patent and that said Letters Patent is hereby corrected as shown below:

Delete the title page and substitute therefore the attached title page showing the corrected number of claims in patent.

Column 5, line 29 - Column 6, line 65,
Replace the text of all published Claims 1-25 with the following correct Claims 1-22:

1. A laser welding fixture for holding a workpiece, the fixture comprising:
    a base;
    a processing head adapted to magnetically couple to the base, the processing head having at least one collet holder assembly and at least one stop; and
    a collet removably coupled to the collet holder assembly.

2. The fixture of claim 1 wherein the collet includes a first portion magnetically coupled to a second portion and further wherein the collet includes an internal cavity adapted to accept a portion of the workpiece.

3. The fixture of claim 1 wherein the collet is magnetically coupled to the holder assembly.

4. The fixture of claim 1 further including a second processing head adapted to magnetically couple to the base.

5. The fixture of claim 1 wherein the collet and the holder assembly include a slot to accept the workpiece.

6. The fixture of claim 2 wherein the internal cavity is coated with a material to help retain the work piece in the internal cavity.

7. The fixture of claim 6 wherein the material is silicone.

This certificate supersedes the Certificate of Correction issued May 18, 2010.

Signed and Sealed this

Twenty-second Day of June, 2010

David J. Kappos
*Director of the United States Patent and Trademark Office*

8. The fixture of claim 2 wherein the first portion and second portion are hinged so that the collet can maintain an open or closed position.

9. The fixture of claim 1 wherein the workpiece is a lead assembly.

10. The fixture of claim 1 further including a tray sized to hold portions of the workpiece not undergoing a welding operation.

11. The fixture of claim 10 wherein the tray is releasably attached to the processing head.

12. The fixture of claim 10 wherein the tray is releasably attached to the base.

13. The fixture of claim 1 further including a clamp adapted to couple the processing head to the base.

14. The fixture of claim 1 wherein the fixture has four collet holder assemblies and further has four stops.

15. The fixture of claim 1 further including a positioning bar adapted to move toward or away from the collet holder assembly, thereby varying the space between the collet holder assembly and the stop.

16. The fixture of claim 15 wherein the positioning bar is slideable.

17. The fixture of claim 1 wherein the collet further includes at least one cavity adapted to retain a resilient material.

18. The fixture of claim 17 wherein the material is silicone.

19. A laser welding system, the system comprising:
a laser source;
a housing; and
a laser welding fixture, the laser welding fixture further comprising:
a base;
a processing head adapted to magnetically couple to the base; the processing head having at least one collet holder assembly and at least one stop; and
a collet removably coupled to the collet holder assembly.

20. A method of using a laser welding fixture, the method comprising:
providing a laser welding fixture for holding a workpiece, the fixture comprising:
a base;
a processing head adapted to magnetically couple to the base; the processing head having at least one collet holder assembly and at least one stop; and
a collet removably coupled to the collet holder assembly;
placing a workpiece in the collet;
loading the collet into the processing head;
loading the processing head into the laser welding fixture;
positioning the collet stop at an appropriate distance from the collet; and performing the welding operation on the workpiece.

21. The method of claim 20 further comprising:
removing the processing head from the laser welding fixture;
removing the collets from the processing head; and
removing the workpieces from the collets.

22. The method of claim 21 further comprising providing a second processing head, loading the second processing head with a workpiece, and performing the welding operation on the workpiece in the second processing head while removing the workpieces from the first processing head.

CERTIFICATE OF CORRECTION (continued)

(12) United States Patent
Bye et al.

(10) Patent No.: US 7,271,364 B1
(45) Date of Patent: Sep. 18, 2007

(54) LASER WELDING FIXTURE AND METHOD

(75) Inventors: Lyle A. Bye, Lino Lakes, MN (US); David A. Crawford, Pine City, MN (US); George E. Greene, Shoreview, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 73 days.

(21) Appl. No.: 11/036,268

(22) Filed: Jan. 13, 2005

Related U.S. Application Data

(60) Provisional application No. 60/555,351, filed on Mar. 22, 2004.

(51) Int. Cl.
*B23K 26/42* (2006.01)

(52) U.S. Cl. .................... 219/121.63; 219/121.82; 219/121.58

(58) Field of Classification Search ........... 219/121.63, 219/121.64, 121.82, 158
See application file for complete search history.

(56) References Cited

U.S. PATENT DOCUMENTS

| | | | | | |
|---|---|---|---|---|---|
| 4,059,979 | A | * | 11/1977 | Mackie et al. | ............ 72/342.94 |
| 4,214,766 | A | * | 7/1980 | Rall et al. | ............ 279/46.7 |
| 4,594,757 | A | * | 6/1986 | Johnson, Jr. | ............ 29/33 K |
| 4,952,769 | A | * | 8/1990 | Acheson | ............ 219/76.14 |
| 5,609,102 | A | | 3/1997 | Rapp | |
| 5,716,057 | A | * | 2/1998 | Wright et al. | ............ 279/62 |
| 6,371,274 | B1 | | 4/2002 | Ditter et al. | |

FOREIGN PATENT DOCUMENTS

| | | | | |
|---|---|---|---|---|
| DE | 004315441 | A1 | * | 11/1994 |
| FR | 2611543 | A | * | 9/1988 |
| JP | 402280961 | A | * | 11/1990 |
| JP | 403238188 | A | * | 10/1991 |
| JP | 404356382 | A | * | 12/1992 |
| JP | 407097023 | A | * | 4/1995 |
| JP | 407202491 | A | * | 8/1995 |
| JP | 2002052085 | A | * | 2/2002 |

* cited by examiner

*Primary Examiner*—Samuel M. Heinrich
(74) *Attorney, Agent, or Firm*—Faegre & Benson, LLP

(57) ABSTRACT

A laser welding fixture for holding a workpiece includes a base, a processing head adapted to magnetically couple to the base, and a collet. The processing head has at least one collet holder assembly and at least one stop. The collet is removably coupled to the holder assembly.

22 Claims, 11 Drawing Sheets